No. 683,571. Patented Oct. 1, 1901.
M. A. NELSON.
BROADCAST HAND SEED SOWER.
(Application filed July 23, 1901.)
(No Model.)
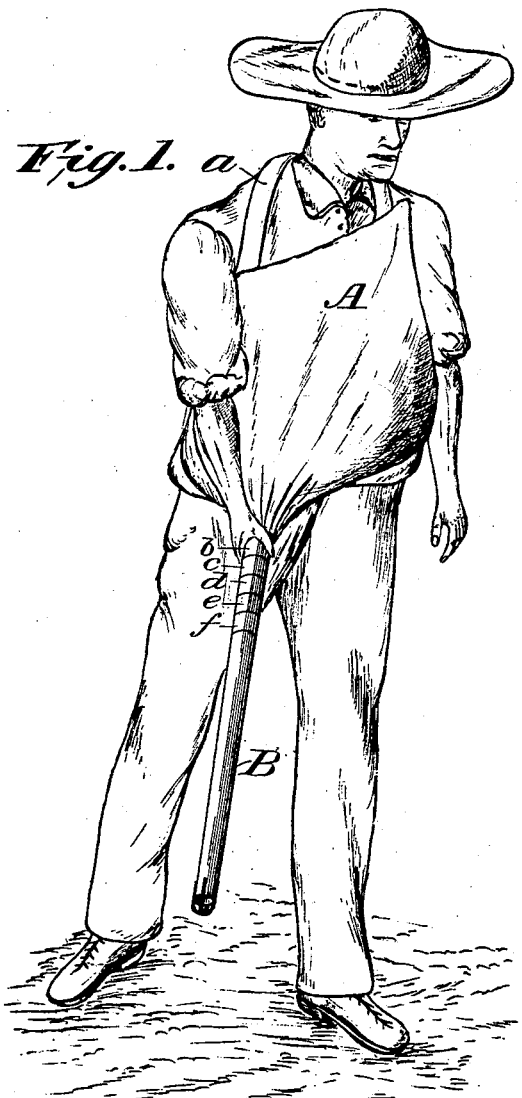
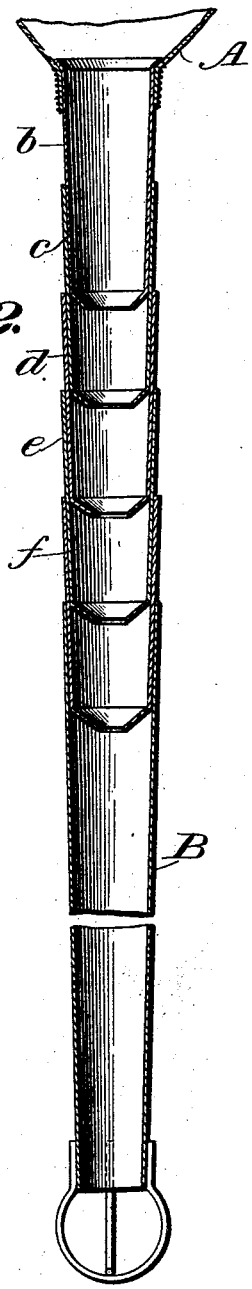
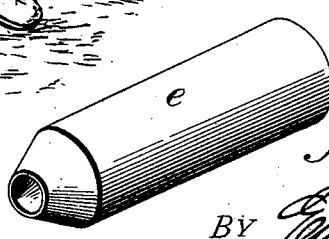
WITNESSES:
INVENTOR.
M. A. Nelson,
BY
Attorney

UNITED STATES PATENT OFFICE.

MILFORD A. NELSON, OF KNOBNOSTER, MISSOURI.

BROADCAST HAND SEED-SOWER.

SPECIFICATION forming part of Letters Patent No. 683,571, dated October 1, 1901.

Application filed July 23, 1901. Serial No. 69,368. (No model.)

*To all whom it may concern:*

Be it known that I, MILFORD A. NELSON, a citizen of the United States, residing at Knobnoster, in the county of Johnson and State of Missouri, have invented new and useful Improvements in Broadcast Hand Seed-Sowers, of which the following is a specification.

This invention relates to new and useful improvements in broadcast hand seed-sowers, and has for its object to provide a simple and efficient device for sowing different kinds of seeds.

The invention consists of a sowing-spout, which is made up of a number of sections so constructed as to engage one with the other, the upper sections having their ends constructed so that a discharge-opening of the proper size for the seed to be planted will be provided, the spout being shortened by the removal of certain sections in planting larger seed and lengthened for smaller seed to provide for a proper distribution of the same, as will be hereinafter set forth.

In the accompanying drawings, which illustrate one embodiment of my invention, Figure 1 is a perspective view showing the application and manner of using the invention. Fig. 2 is a longitudinal sectional view taken through the discharge-spout, and Fig. 3 is a perspective view of one of the seed-controlling sections detached.

A designates a seed-holding sack which is provided with a suitable supporting-strap $a$. To one of the corners of such a sack is attached the upper section $b$ of the seed-sowing spout, the upper end thereof being flared outward, while its lower end is contracted or flared inward and downward to provide an opening at the end of the section, which is smaller than the opening above. To the section $b$ is attached a section $c$, the upper end of which is adapted to be placed over the lower end of the section $b$, and the end of the section $c$ has an opening which is somewhat smaller than the opening in the section above. In practice a plurality or series of sections, as $d$, $e$, and $f$, are employed, they each being similar in construction except as to the size of the openings, and to the section which is used in accord with the size of the seed to be sown there is attached a spout B, which tapers longitudinally and is provided at its lower end with cross-wires or other suitable form of guard, so as to prevent the end of the spout being clogged with earth.

In a device of this character when the smallest seeds are to be sown all of the several sections, as $b$, $c$, $d$, $e$, and $f$, are used, so as to have the discharge-spout of the greatest length. Thus in sowing small seeds the discharge end of the spout will be near the ground. In sowing larger seeds one or more of the sections are removed, thus shortening the length of the spout as a whole and giving a larger space, so that the seeds may be more widely separated after leaving the spout in sowing. By means of this device seed may be sown much more evenly than by hand and with less effort. The quantity of seed which passes from the sack to the spout is regulated by the size of the opening in the lower section.

With this device there are no valves to get out of order, nor are there any parts to adjust to regulate the flow of seed. In practice the sections $b$, $c$, $d$, $e$, and $f$ may have marked or otherwise indicated thereon the name of the seed for which said sections are intended to be used in planting.

Having thus described my invention, what I claim as new, and desire to secure by Letters Patent, is—

1. A broadcast hand seed-sower consisting of a seed-receptacle, a sowing-spout attached thereto and made up of a plurality of separable sections, several of the sections having contracted ends to provide each section with seed-discharge openings of different sizes, substantially as shown.

2. A broadcast hand seed-sower consisting of a seed-receptacle, a sowing-spout made up of a plurality of longitudinally-tapered sections which are adapted to engage one with the other, the successive sections having contracted ends with seed-discharge openings which are of a size different from the openings of the other sections, and an end discharge-spout having a guard, substantially as shown.

In testimony whereof I have hereunto set my hand in presence of two subscribing witnesses.

MILFORD A. NELSON.

Witnesses:
JOHN C. FOSTER,
HARRY L. COLLINS.